United States Patent
Thayathil et al.

(10) Patent No.: US 7,260,474 B1
(45) Date of Patent: Aug. 21, 2007

(54) GIS POINT-TO-POINT ROUTING FOR DIRECTIONS

(75) Inventors: Sathiaprakash Thayathil, Marysville, OH (US); Adam Parker, Pickerington, OH (US)

(73) Assignee: Cellco Partnership, Bedminster, NJ (US)

( * ) Notice: Subject to any disclaimer, the term of this patent is extended or adjusted under 35 U.S.C. 154(b) by 248 days.

(21) Appl. No.: 11/052,043

(22) Filed: Feb. 8, 2005

(51) Int. Cl.
*G01C 21/26* (2006.01)
*G08G 1/137* (2006.01)

(52) U.S. Cl. .................. 701/202; 701/211; 701/24; 701/28; 340/995.1; 340/995.12; 342/357.09

(58) Field of Classification Search ........ 701/200–202, 701/208, 117–119, 213–214, 23–28, 211; 342/357.06, 357.09, 357.1; 340/988, 990, 340/995.1, 995.12, 995.23
See application file for complete search history.

(56) References Cited

U.S. PATENT DOCUMENTS

| 5,422,812 | A | 6/1995 | Knoll et al. |
| 5,442,349 | A | 8/1995 | Inoue et al. |
| 5,648,768 | A | 7/1997 | Bouve |
| 5,850,193 | A * | 12/1998 | Shimoura et al. ......... 340/995.1 |
| 6,148,090 | A | 11/2000 | Narioka |
| 6,154,745 | A * | 11/2000 | Kari et al. .................. 707/100 |
| 6,498,982 | B2 | 12/2002 | Bellesfield et al. |
| 6,992,598 | B2 * | 1/2006 | Poltorak ................ 340/995.19 |
| 2002/0095256 | A1 | 7/2002 | Jones et al. |
| 2004/0054428 | A1 | 3/2004 | Sheha et al. |

* cited by examiner

*Primary Examiner*—Y. Beaulieu
(74) *Attorney, Agent, or Firm*—McDermott Will & Emery LLP

(57) ABSTRACT

To provide a convenient selection of origin and/or destination of a route, in an on-line map service, the user is permitted to select and view a map and select any point from the displayed map as one of the points necessary for computation of a route. In an example, the user selects a start point, and the client device provides pixel coordinates of the first selected point. The user then selects the other point from the map, and the client device provides coordinates of the other selected point. A GIS program at the client converts the coordinates to map units and communicates with the server in order to access map information, compute a route, and send back route information for presentation to the user. The resulting route information, for example, may take the form of a map display highlighting the route or textual instructions for traveling the route.

24 Claims, 8 Drawing Sheets

GIS POINT-TO-POINT ROUTING FOR DIRECTIONS

TECHNICAL FIELD

The present teachings relate to on-line map services and user-friendly techniques to allow input of a user selection of an origin and/or a destination, for obtaining route directions from an on-line map service.

BACKGROUND

People often use maps to plan and guide them during travel. Where the origin and destination are known or selected, a route can be traced on a street map and/or presented as textual directions. Traditionally, travel agencies, car rental firms and automobile/travel clubs provided paper maps or map booklets of region(s) to be traveled along the route, with highlighting to indicate the recommended travel route.

Map applications were developed for personal computers that offered similar capabilities utilizing a local database of map information. The computer's user interface allowed the user to input points of origin and destination, and possibly points of interest along the way. The application program would retrieve information from the database to construct a display of a map, overlaid with a route between the origin and destination. The personal computer typically offered an option to print out a copy of the resulting route map. Similar route mapping capabilities have been developed for on-board vehicle navigation systems and/or handheld GPS type navigation devices.

More recently, on-line services, like Mapquest.com, have offered map and direction capabilities via the Internet. Such services utilize a client-server communication paradigm. Essentially, the mapping database resides on a server coupled to the public Internet. A user establishes a communication session through the Internet, and client browser software enables communications with the server. Via the client browser, the user can identify a point or location, and the server returns map data for displaying the selected location. If the user operates the terminal device to identify a point on the map, the browser sends the selection to the server and the server returns a related map display, e.g. a version of the map zoomed in on the selected point. The user may also input origin and destination information, and the server will return map data showing the route between the points and textual directions for travel between the points.

The user interface capabilities of the on-line services for mapping routes and/or providing travel directions, however, have been limited. Existing on-line services, designed to map and plot routes require the user to enter some amount of address information. This address information could be in the form of a full address or may be just a zip code or city/state combination. The point is that some sort of address information is required, for both the starting point of the route (origin) and the ending point (destination) of the route. While such an approach is convenient at times, there are situations where a user may prefer a quicker or more convenient solution for inputting information about one or the other or both of these key points of reference.

SUMMARY

To provide a convenient selection of origin or destination (or both) for a route, in an on-line map service, the user is permitted to select and view a map and select any point from the displayed map as one of the points necessary for computation of a route. In an example, the user selects a start point, and the client device provides x and y coordinates of the first selected point on the map display. The user then selects the other point from the map, and the client device provides x and y coordinates of the other selected point on the map display. In the example, a program at the client, downloaded from the server, converts the coordinates to map units, e.g. that translate to longitudes and latitudes that the server-side program uses to identify the points in its map database. The server-side program processes the point data and sends back route information, for presentation to the user, for example, as a map display highlighting the route or as textual instructions for traveling the route.

Hence, a method of presenting travel route information to a user might begin with transmitting a map image through a data communication network to a client device, for display to the user. A user selection of a point, which the user may select from anywhere on the map image as a point of origin or a destination point, is received through the data communication network from the client device. The method also involves identifying the other one of the point of origin and the destination point. In the disclosed example, the other point is identified by receipt of a similar selection of a point from anywhere on the map image, although the second point may be selected in other ways. The method also entails computing information about a recommended route between the points and transmitting the information through the data communication network to the client device, for presentation to the user. The presentation, for example, may be a map display of the route or directions for traversing the recommended route.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
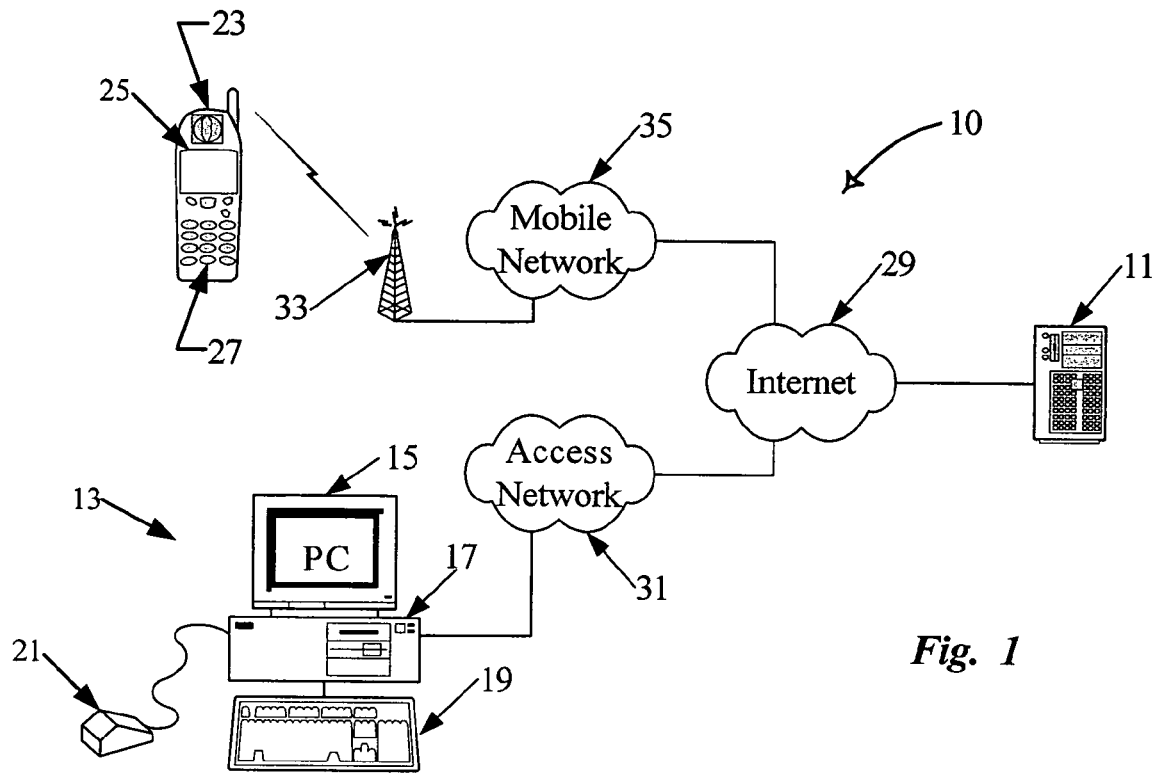
FIG. 1 a simplified functional block diagram of a client-server system for providing an on-line interactive map service.

Reference now is made in detail to the examples illustrated in the accompanying drawings and discussed below. FIG. 1 illustrates the elements of a system 10 for providing an on-line interactive type Geographic Information Systems (GIS), such as a service providing maps, route mapping and/or driving directions.

The system 10 utilizes a client-server paradigm. Essentially, a server 11 provides selected information to users of client devices. In an example, the server software included an ESRI type GIS application. A Java script program is added to convert point selection user input data to map unit input data, that is to say in the standard needed to access route mapping functions of the ESRI software.

A client device may comprise any terminal or other user device capable of data communication with the server 11, which has capabilities allowing display of an image (e.g. of a map) and user selection of a point that may be anywhere on the displayed image. Two common examples are shown in the drawing. The first example of a suitable client device is a personal computer (PC) 13. Of course, the PC 13 may be a laptop or handheld unit, but for purposes of illustration and discussion, the PC is a desktop model. The desktop PC 13 comprises a processing unit 15, a display for presentation of information to the user, and user input devices represented by a keyboard 19 and a cursor control/selection device represented by the mouse 21. Those skilled in the art will recognize that the PC may offer other user input devices in addition or in place of the keyboard or mouse, such as other cursor control and selection devices (e.g. joysticks, trackballs, touchpads, etc.) or speech responsive control. Some such devices, particularly handheld units, also offer touch screen input capabilities.

The second illustrated example of a client device shown is a wireless terminal device, such as a web enabled digital cellular telephone handset 23. The handset 25 includes a display 25 for presentation of information to the user and a keyboard 27 or the like for user input of data and user selections. Many cellular mobile stations 23 offer cursor control and selection type user input capabilities that allow a user to point-and-click on a displayed object, much like the capability offered with the display and mouse of the exemplary PC 13.

The server 11 is connected for packet switched data communications via the public network now commonly known as the Internet 29. The link of the server to the Internet can utilize any convenient fiber, wire or wireless transport technology providing sufficient data communication bandwidth to support the expected traffic from users of the various client devices 13, 23. The PC communicates through an access network 31 and the Internet 29. Examples of the network 31 include dial-up access networks, digital subscriber line (DSL) networks, cable modem networks, local or wide area private networks, wireless hotspots, etc. The mobile station handset 23 communicates over the air with a base station 33, and through an associated mobile network 35 with the Internet 29. The mobile service providers offer such access via a number of different technologies, some of which provide narrowband data service and some of which now offer broadband mobile data service.

Essentially, a user of either of the client devices 13 or 23 surfs the web to reach the web site offered by the server 11. The user operates the device to input selection information, which the client device communicates to the server 11. In turn, the server 11 communicates information, in this case including map information and/or route travel directions, to the client device for display or other output to the user. In accord with the present teachings, the user input of origin and/or destination points utilizes cursor control or other point selection control, to select point(s) from a displayed map. To appreciate these operations, it may be helpful to consider an example, with respect to the flow chart of FIG. 2 and the exemplary displays of FIGS. 3(A) to 3(E).

In the example, the user utilizes cursor control and selection input, sometimes referred to as "point and click," to select two points from a displayed map. Examples will be discussed later in which one point is selected in this manner and the other point is input in another convenient way. The interactive service allows a user to obtain travel directions from any two points that can be connected by driving or walking or the like. The user, in just two quick steps, can obtain directions between these points.

Figure 3A:
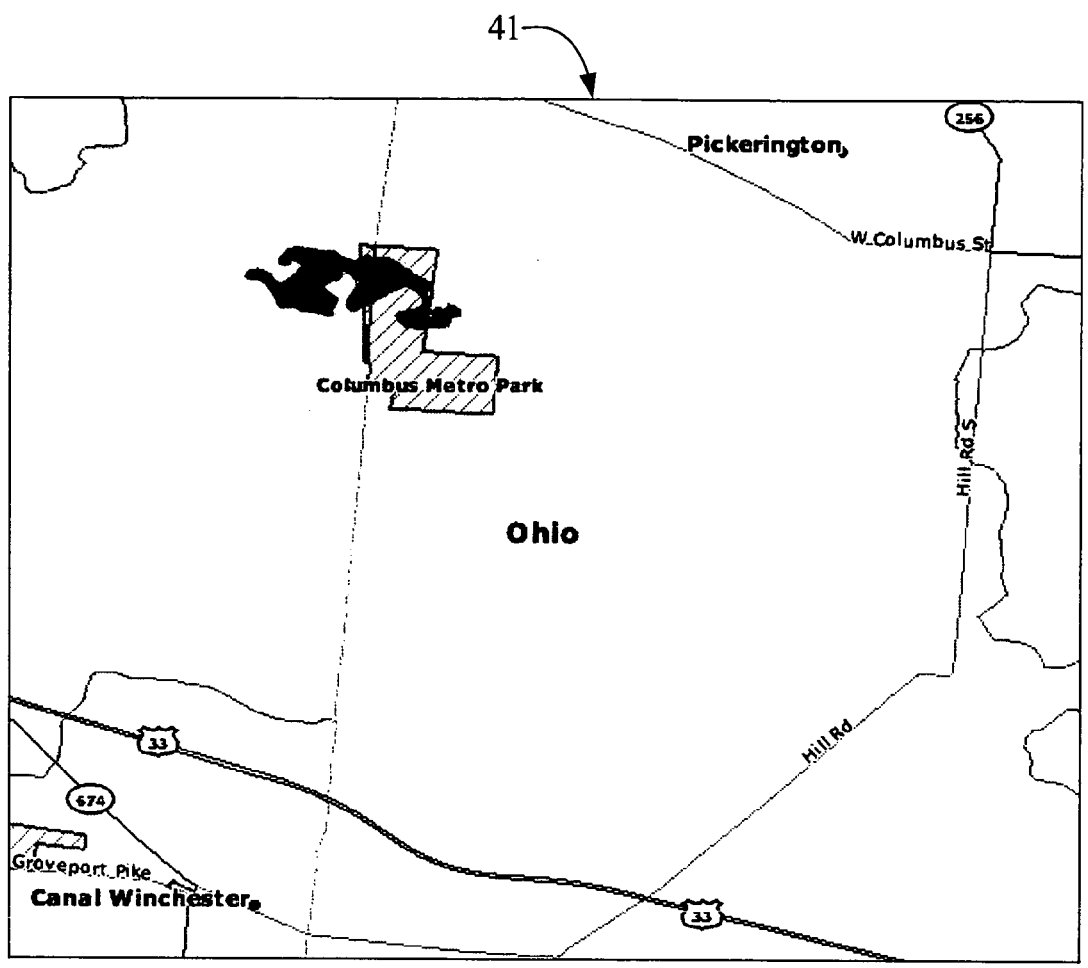
FIGS. 3(A) to 3(E) is screen shots of exemplary displays that may be provided to a user during a procedure in accord with the flow chart of FIG. 2.

Initially (step S1), the user requests a digital map from the service offered from server 11. In this regard, the home page of the service may show a large area map, e.g. of the United States, and the user 'clicks' on the area of interest to zoom in, and the server will provide the closer view of the selected area for display to the user. Repetition of this process allows the user to drill down to the desired level. Alternatively, the initial display may represent an area of a certain size around the current location of the client device, for example, the current position of the mobile station 23 as determined by the network 35 or by Global Position System (GPS) data if the handset 23 is GPS enabled. As another alternative, if the user accesses the service regularly, the client-server system may store some profile data for the user or her terminal, such as preferred (e.g. home) address or zip code and use the profile data to provide an initial map display. FIG. 3(A) shows an example of an initial display of a user-selected map 41, in this case, of a portion of the state of Ohio.

When the server sends the web page containing the map, the server also downloads a Java script to the client device. The Java script runs when the user selects points from the map, to convert pixel data regarding each selected point to map units used by the GIS application in the server.

Figure 3B:
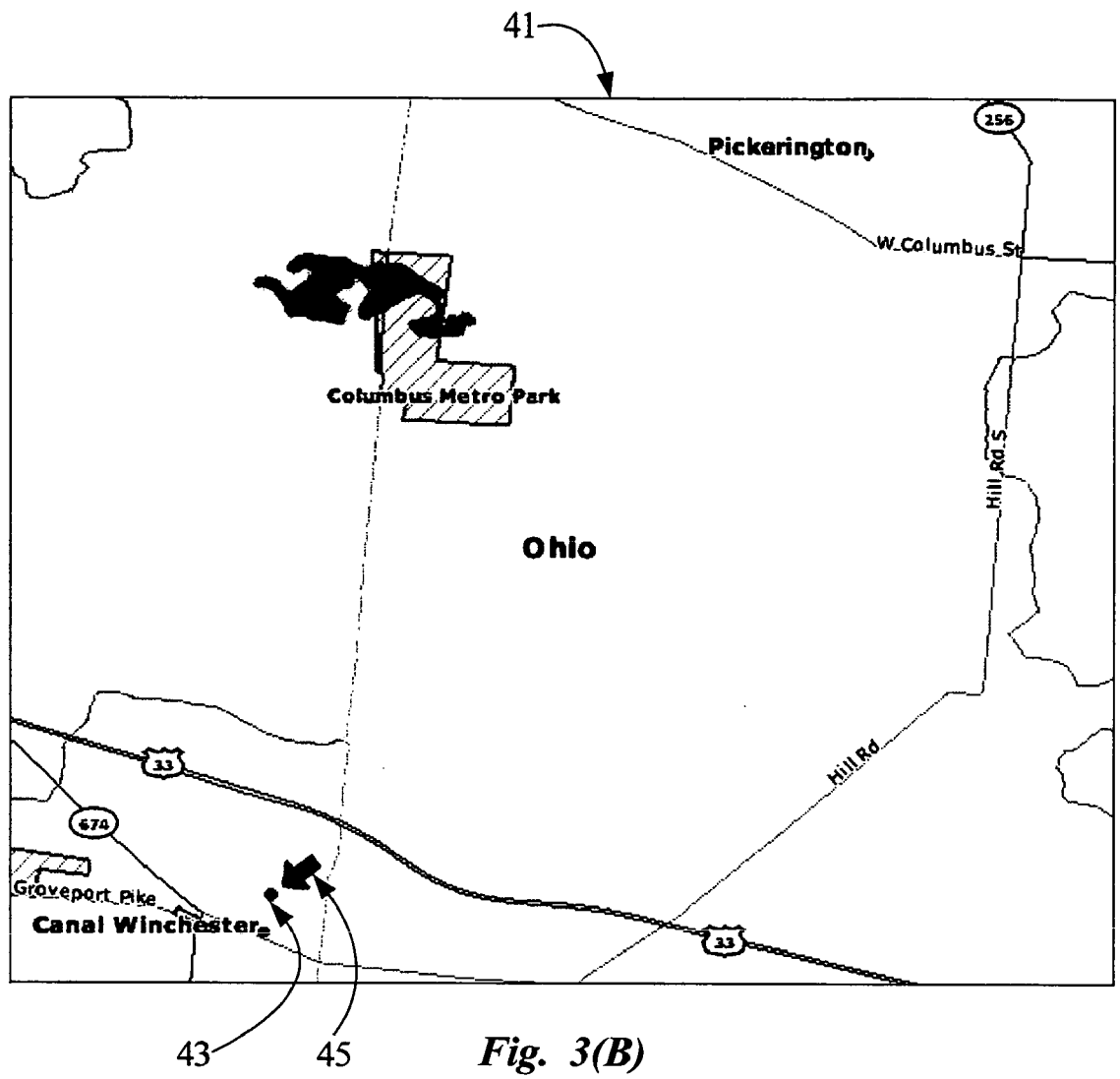

Once the user has selected and viewed the desired map, the user activates the cursor control of the client device 13 or 23 to select and click-on a point anywhere on the displayed map, to select a starting point (step S2). The selected starting point may be represented by a dot 43, and the cursor may be represented by an arrow 45, both of which are overlaid on the map 41 as shown in FIG. 3B. Of course other highlighting or display icons may be used to represent the cursor and show the selected point.

The image display uses a pixel format. Points on the display of the map correspond to pixel locations of the visible image. Assume that the user is at the PC 13. Hence, the software causes the processing unit 17 to detect the x and y pixel coordinates of the selected point on the current display image. The selected pixel coordinates are converted to map units and stored on the client.

At step S3, the PC 13 converts the pixel coordinates of the mouse pointer position to units appropriate for accessing its GIS database; typically map units, which translate to longitude and latitude. For this purpose, the client is aware of the map image displayed and the scale thereof, either from its transmission of the image or from return data sent back by the server. The client stores the converted coordinate data of the first point and awaits further input. A further prompt may be sent to the client device to prompt the user to select a destination.

Figure 3C:
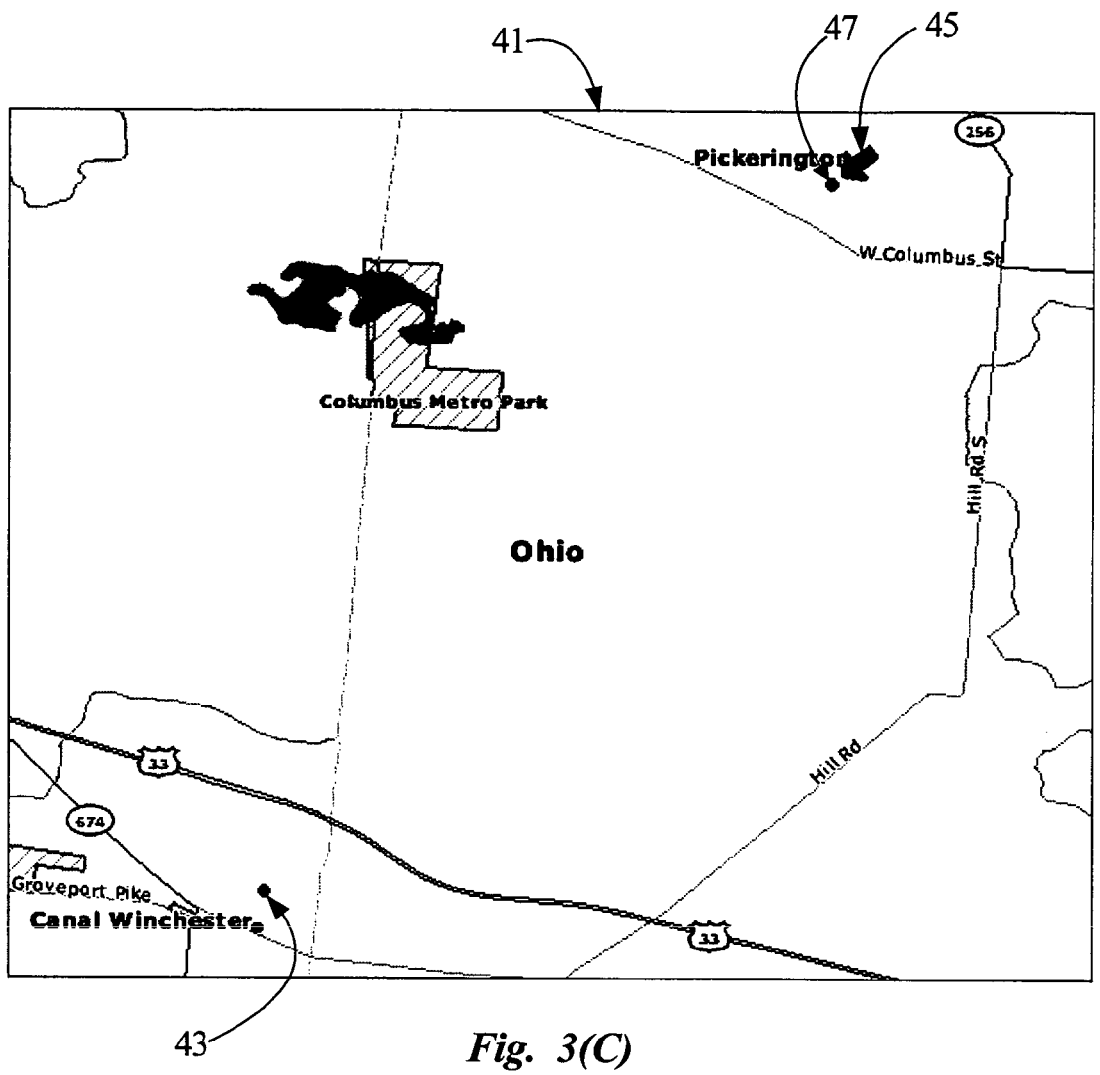

Next (step S4), the user activates the cursor control of the client device 13 or 23 to select and click-on a point anywhere on the displayed map, to select a destination or end point. FIG. 3(C) shows the cursor arrow 45 moved to a second point 47 on the map 41. The selected end point may be represented by the dot 47 or other convenient highlighting or display icons.

Assume again that the user is at the PC 13. Hence, the software causes the processing unit 17 to detect the x and y pixel coordinates of the second selected point 47, as was done of the first point. The selected pixel coordinates are converted to map units and stored on the client, as was done of the first point. The PC 13 will communicate with the server 11 the stored map units from S3 and S5 and begins further processing.

Essentially, the GIS processing software in the server 11 accesses one or more databases to determine a route for travel between the point 43 and the point 41. A variety of software packages are known for maintaining the database, accessing the appropriate information and determining the best route based on some defined routing criteria (which may be preset or user selected). The example uses an ESRI package. Based on the route determination, the server generates a new version 51 of the map, with the points 43 and 47 as well as a highlighted route there between and sends the new map page through the networks to the appropriate client device. The PC 13 or handset 23 displays the new version of the map 51 to the user, as shown for example in FIG. 3(C).

Figure 3D:
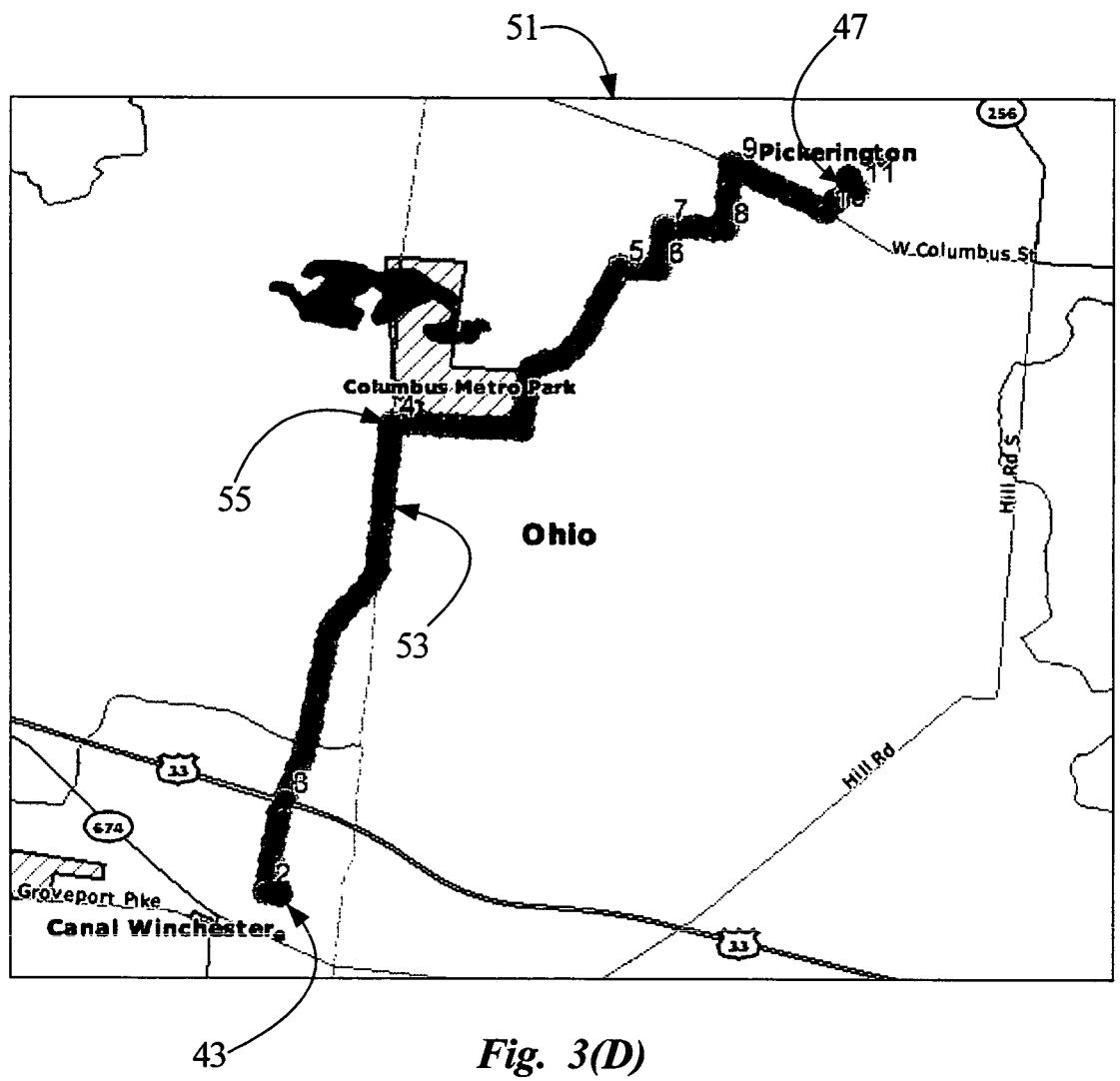
Figure 3E:
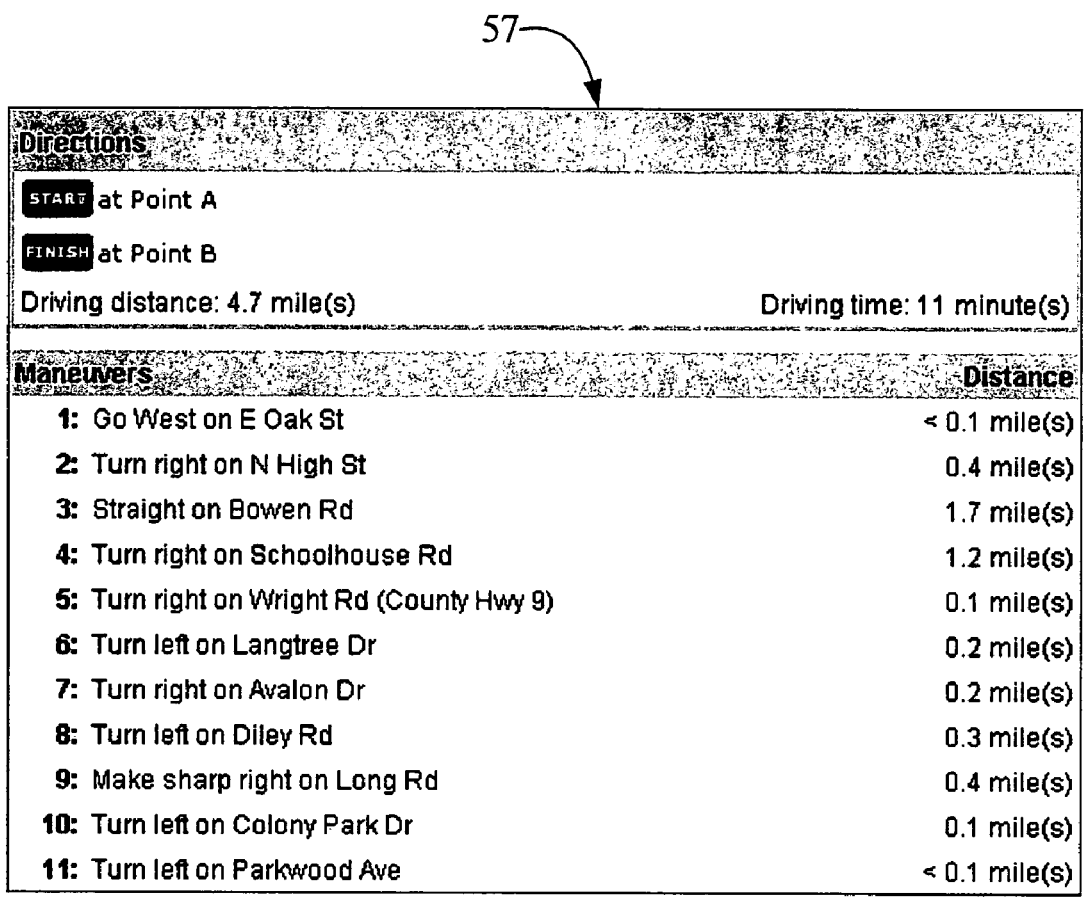

In this way (at S6), the user is presented with a digital map, such as the example shown in FIG. 3(D), displaying a route 53 running from the starting point 43 to the end point 47. The display may show a number of points 55 along the route, at which maneuvers are required or which represent intermediate points of interest. The server 33 also offers the capability to compile textual directions 57 for transmission to the client device for display as shown for example in FIG. 3(E). The directions 57 may outline maneuvers needed to drive the route or to walk the route (e.g. in an urban setting or the like).

This product goes above and beyond the conventional way to look up driving directions you might find on other websites, which required user input of address-to-address, zip_code-to-zip_code, etc. It allows users to simply click two places on a display of a digital map (FIGS. 3(B) and 3(C)) and obtain not only a graphical representation of the route 53 (FIG. 3(D)) but also textual driving directions 55 (FIG. 3(E)). This offers the ability to convert any user input of x-coordinate and y-coordinate of the selected display pixel position into map units, which translate to a longitude/latitude pair that can be graphically demonstrated on a digital map.

Figure 4:
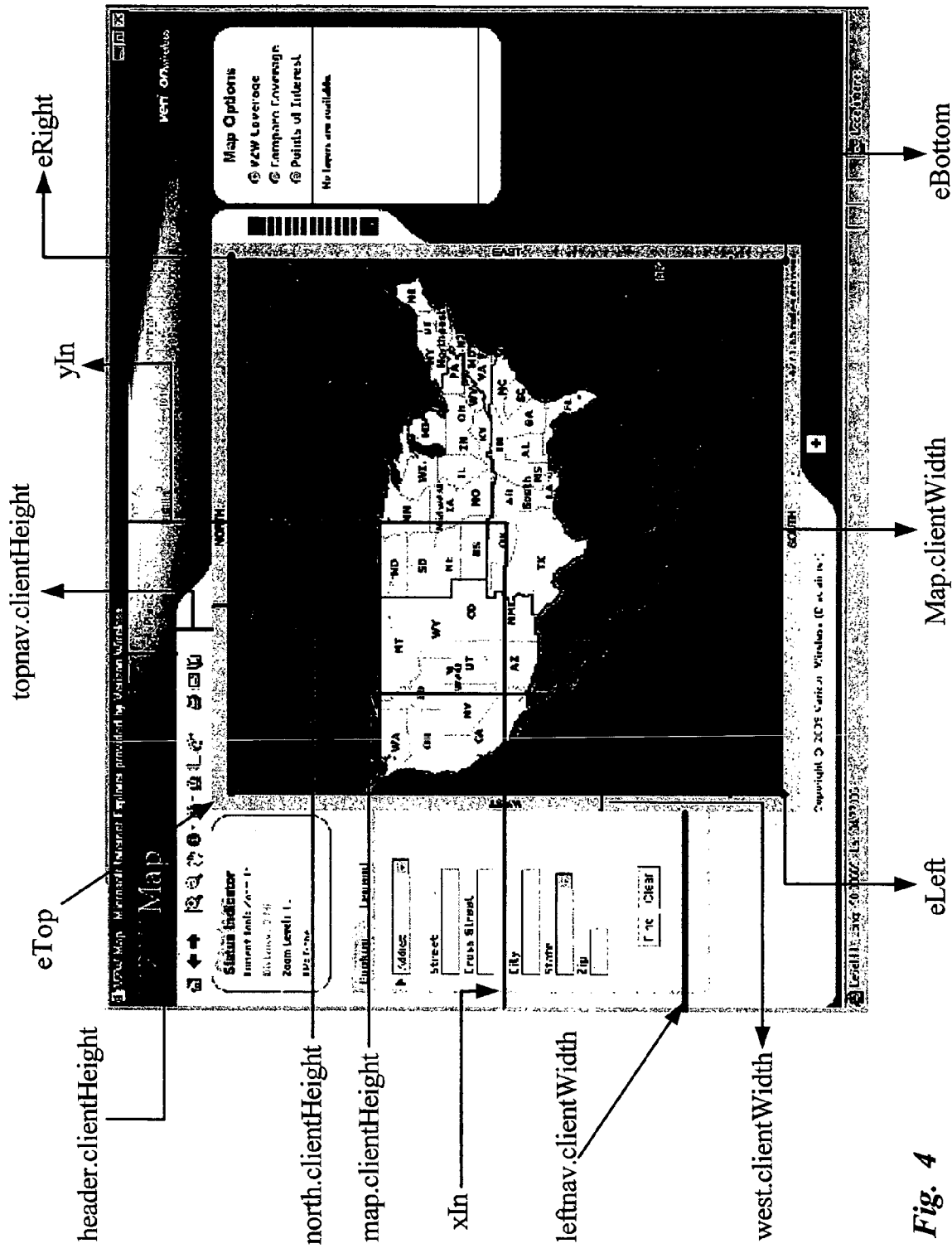
FIG. 4 illustrates a map service display page, overlaid with identifications of points on the exemplary map that are used in a process for converting x-y coordinates to degrees (e.g. latitude and longitude) for use by a route mapping program.

In the procedure outlined above, x and y pixel coordinates of map points selected by the user were converted to appropriate map unit degrees, e.g. degrees of latitude and longitude, to enable the routing software to map the route and/or produce textual directions for the route. Initially, the selection, e.g. where the user 'clicked' on the map with the mouse or other input device, is identified by the pixel coordinates of the point on the display screen. The Java script program on the client converts these coordinates to map units compatible with the ESRI map software, e.g. to units which translate into longitude and latitude which may be used to determine locations and routes. A number of techniques may be used to perform this conversion. In an example, a Java script accepts the x and y pixel coordinates and performs the conversion to degrees. FIG. 4 illustrates a map service display page, overlaid with identifications of points on the exemplary map that are used in the exemplary conversion process.

The Java script implements the following algorithm to convert the pixel x-coordinate of the mouse clicked location to map unit x-coordinate (with reference to FIG. 4):

```
xIn = x-coordinate for the mouse clicked location.
    (Notates horizontal coordinate where user has clicked the map)
xDistance = Math.abs(eRight-eLeft);  // Width in Map units
    (Program calculates left to right hand width of map image in map
    units)
pixelX = xDistance/map.clientWidth;  // Map width in map units divided
                                      map image width in pixels.
    (Program calculates the ratio of map units to pixels)
mouseX = (xIn − (leftnav.clientWidth+west.clientWidth));
                                     // Finding out where the user
                                        is clicked relative to the
                                        map image.
    (Program calculates to remove width of left hand navigation
    (leftnav.client) area and the map frame (westclient Width) from
    the x-coordinate mouse click location (where user clicked map).
    This means that the width calculation accounts for the actual map
    image and not the frames around it.)
mapX = (pixelX * mouseX) + eLeft; // Convert pixel to map unit and
                                     add Map left coordinate.
    (Program now translates actual calculation from pixels to map units.
    This is calculated in degrees that translates to longitude and latitude)
```

The Java script implements the following algorithm to convert the pixel y-coordinate of the mouse clicked location to map unit y-coordinate (with reference to FIG. 4):

```
yIn = y-coordinate for the mouse clicked location.
    (Notates vertical coordinate where user has clicked the map)
yDistance = Math.abs(eTop-eBottom);    // Height in Map units.
    (Program calculates top to bottom hand height of map image in map
    units)
pixelY = yDistance/map.clientHeight;   // Map height in units divided by
                                          map image in height in pixels.
    (Program calculates the ratio of map units to pixels)
mouseY = map.clientHeight −            // Find out where the user is
                                          clicked
    (yIn − (header.clientHeight +      // relative to the map image.
        topnav.clientHeight+north.clientHeight));
    (Program calculates to remove height of top tool bar
    (topnav.clientHeight), map frame (north.clientHeight) and header
    header.clientHeight) area from the y-coordinate mouse click location
    (where user clicked map). This means that the height calculation
    accounts for the actual map image and not the frames around
    it.)
mapY = (pixelY * mouseY) + eBottom;  // Convert pixel to Map unit and
                                        add Map bottom coordinate.
    (Program now translates actual calculation from pixels to map units.
    This is calculated in degrees that translates to longitude and latitude)
```

The server sends the Java script with the page containing the map image, so that the client device executes the Java scrip when the user selects coordinates from the map image, via the client-browser application. In the example, the Java script performs the conversion to map units at the client. Those skilled in the art will recognize that conversion software in other forms may be downloaded to run with the client browser in the user's device, e.g. as a cookie and/or an applet. Those skilled in the art will also recognize that the conversion could be down by front end software on the server side.

Figure 2:
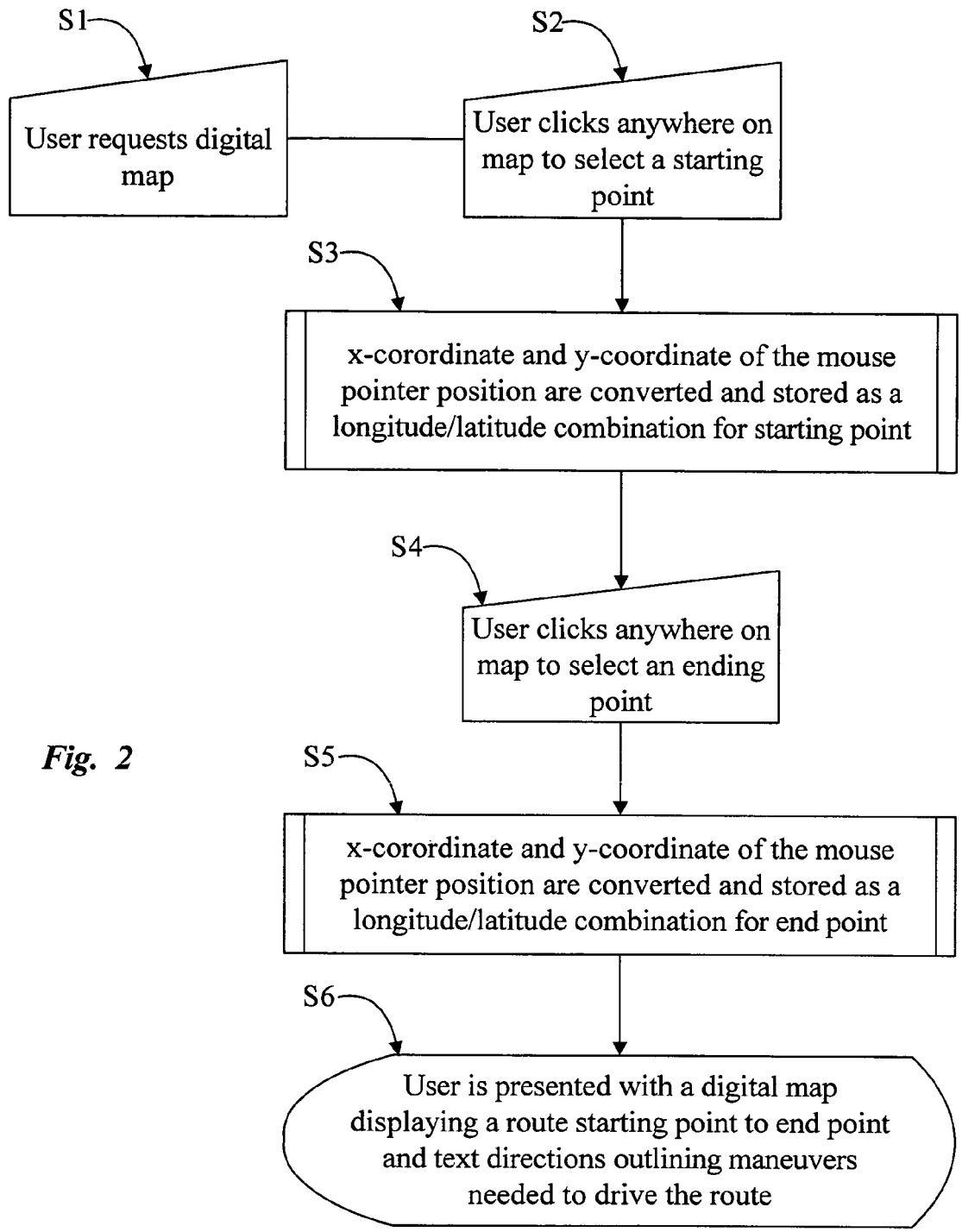
FIG. 2 is a flow chart of a technique for obtaining user selections of origin and destination points and providing a route and/or directions for travel between the two selected points.

In the example of FIGS. 2 to 4, the point and click selection technique was used for user input of both the origin and destination of the desired route. Those skilled in the art will recognize that this technique may be used to allow the users to select additional points, e.g. intermediate points for stops or points of interest along or near the route. Artisans will also recognize that the point-and-click selection may select only one of the end points. In practice, one point may be entered by other means, for example during selection of the initial map display or based on pre-stored profile or preference data. The alternative selection may involve a textual or speech input of an address or other coordinates, or if the user device (e.g. GPS enabled handset 23) provides location, the service may utilize the current location as one of the two end points. In the example, the user selected the point of origin first. Obviously, the program could allow initial selection of the destination.

Also, a typical service will offer the option of point-and-click selection or other on-screen point selection as just one way to input the start and end points. The service, for example, may still offer the traditional text input option, to allow a user to input the address of either one or both of the start and end points.

Aspects of the present teachings appear in programmed systems and in programs for operation of systems, for implementing on-line interactive map services of the type generally outlined above. Presumably those skilled in the art are familiar with the structure of such systems and with the programming thereof, hence, only a summary discussion is provided here.

Figure 5:
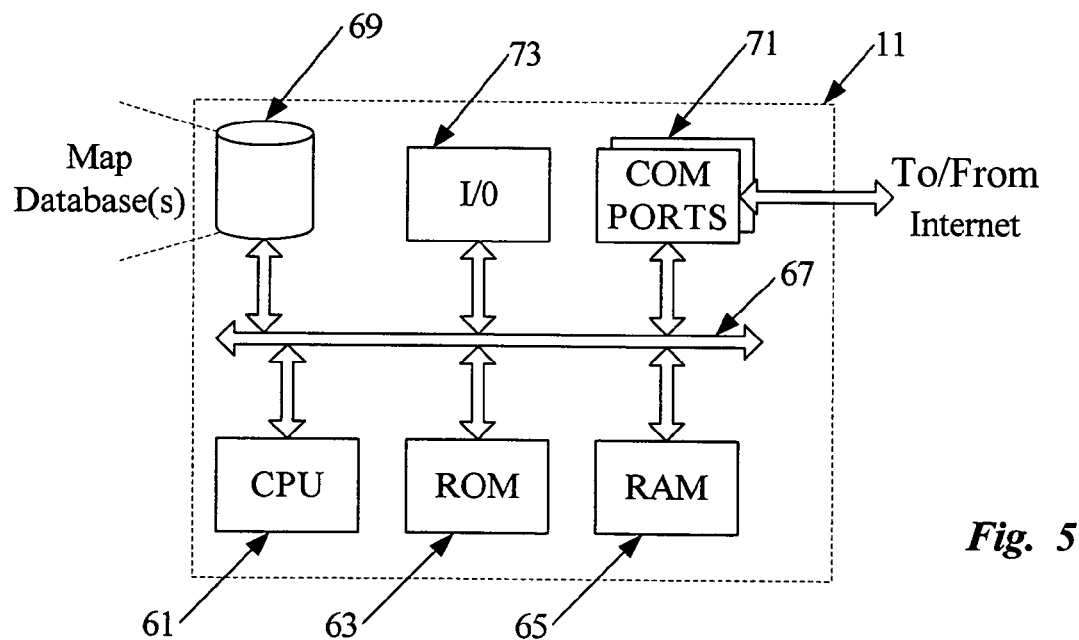
FIG. 5 is a simplified functional block diagram of a server for use as the map server in the system of FIG. 1.

FIG. 5 shows a general-purpose computer system, which may operate as a server or the like in the system of FIG. 1, for example, as the server 11 discussed earlier. The exemplary computer system 11 contains a central processing unit (CPU) 61, read only memory (ROM) 63, random access memories (RAM) 65 and an interconnect bus 67. The main memories represented by the ROM and RAM may include a variety of other storage elements, such as high-speed cache memory. The CPU 61 may contain a single microprocessor, or may contain a plurality of microprocessors for configuring the computer system of server 11 as a multi-processor system. The main memory typically includes dynamic random access memory (DRAM), and in operation, the main memory stores at least portions of data and of instructions for execution by the CPU 61.

The computer system of server 11 also includes mass storage devices such as various optical and/or magnetic disk drives, tape drives, etc., represented in the example by the hard disk drive 69. The mass storage on the drive 69 stores the data and programming related to the on-line services available from the server 11, including the map database(s), the map service server program (ESRI and Java script in our example) and text and graphics for the web pages. Program instructions are loaded to main memory and are supplied from main memory to the CPU for execution. The mass storage may also include one or more drives for various portable media, such as a floppy disk, a compact disk read only memory (CD-ROM), or an integrated circuit non-volatile memory adapter (i.e. PCMCIA adapter) to input and output data and code to and from the computer system 11.

The computer system of server 11 also includes one or more input/output interfaces for communications, shown by way of example as interfaces 71 for data communications. The interfaces 71 may include, an Ethernet card or any other appropriate data communications devices. To perform as the server 11, at least one of the interfaces 71 preferably provides a relatively high-speed link to the Internet 29.

The computer system of server 11 may further include appropriate input/output ports 72 for interconnection with user interface elements (not shown), such as a local display and a keyboard or the like, serving as a local user interface for programming purposes. Alternatively, the server operations personnel may interact with the system 11 for control and programming of the system from a user device, which may be locally connected thereto or connected to the server 11 via the Internet 29 or some other network link.

The computer system 11 runs a variety of server applications programs and stores relevant data, for its intended on-line service operations. Of note for purposes of this discussion, the programming includes a general server application, as well as web software specifically related to the GIS application and associated web interface with client devices for obtaining end point inputs and providing directions as outlined above relate to FIG. 2. Those skilled in the art will recognize that the computer system 11 may run other programs and/or host a wide range of other on-line applications. Also, the functions of the server 11 may be implemented as a single computer system or as a distributed system having multiple appearances, some of which may be at different nodes on a network.

Operations described above may be carried out by execution of software, firmware, or microcode operating computers or other programmable processor devices of any type. The programming of the client devices will typically implement standard client browser applications, appropriate to the particular type of device 13 or 23. The responsive offering of route and direction information will utilize server software, database software and on-line web software, configured to provide the service as outlined above, running in one or more servers 11. Code for implementing such operations may be in the form of computer instruction in any form (e.g. source code, object code, interpreted code, etc.) stored in or carried by any computer or machine-readable medium.

Program aspects of the technology may be thought of as one or more "products," typically in the form of executable code and/or associated data that is carried on or embodied in a type of machine-readable medium. The executable code and/or associated data controls the operation of the server 11 or other programmable device for implementing the processing for the on-line map, route and direction service. Media include any or all of the memory 63, 65 and/or storage devices 69 of the computer system implementing the server 11 or associated modules thereof, such as various semiconductor memories, tape drives, disk drives and the like, which may provide storage at any time for the software programming.

All or portions of the software may at times be communicated through the Internet 29 or various other telecommunication networks. Such communications, for example, may enable loading of the software from another computer (not shown) into the server 11 or into another element. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Terms regarding computer or machine "readable medium" (or media) as used herein therefore relate to any physical medium or transmission medium that participates in providing instructions or code or data to a processor for execution or processing. Such a medium may take many forms, including but not limited to, non-volatile media and volatile media as well as carrier wave and physical transmission media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of presenting travel route information to a user, comprising:
   transmitting a map image through a data communication network to a client device, for display to the user;
   downloading a software script to the client device of the user, for causing the client device to convert x and y pixel coordinates of any user selection of a point on the displayed map image to corresponding coordinates of the displayed map;
   receiving through the data communication network from the client device converted map coordinates for a user selection of a point selected from anywhere on the displayed map image, as one of a point of origin and a destination point for a travel route;
   identifying the other one of the point of origin and the destination point for the travel route;
   computing information about a recommended route between the user selected point and the identified point; and
   transmitting the information about the recommended route through the data communication network to the client device, for presentation to the user.

2. The method of claim 1, wherein:
   the user selection of the point selected from anywhere on the map image comprises x and y pixel coordinates of the selected point on the displayed map image; and
   the method further comprises converting the x and y pixel coordinates of the selected point to map units for accessing a Geographic Information Systems (GIS) map database.

3. The method of claim 1, wherein the step of identifying the other point comprises receiving through the data communication network from the client device a user selection of the other point, selected from anywhere on the map image.

4. The method of claim 3, wherein:
   the user selection of the other point selected from anywhere on the map image comprises x and y pixel coordinates of the selected point on the displayed map image; and
   the method further comprises converting the x and y pixel coordinates of the other point to map units for accessing a Geographic Information Systems (GIS) map database.

5. The method of claim 4, wherein:
   the user selection of the point selected from anywhere on the map image comprises an x and y pixel coordinates of the selected point on the displayed map image; and
   the method further comprises converting the x and y pixel coordinates of the selected point to corresponding map units.

6. The method of claim 5, wherein the step of computing information comprises processing the map units for the points and extracting data from the GIS database to formulate the information about the recommended route.

7. The method of claim 6, wherein the information about the recommended route comprises a map image illustrating a path of the recommended route between the points.

8. The method of claim 6, wherein the information about the recommended route comprises textual directions for maneuvering between the points.

9. A product comprising client/server instructions for programming a computer to implement the steps of the method of claim 1 and a machine readable medium bearing the instructions.

10. A method of presenting travel route information to a user, comprising:
    receiving through a data communication network from a client device a user selection corresponding to a map area;
    transmitting a map image of the area through the data communication network to the client device, for display to the user;
    downloading a software script to the client device of the user, for causing the client device to convert x and y pixel coordinates of any user selection of a point on the displayed map image to corresponding coordinates of the displayed map;
    receiving through the data communication network from the client device converted map coordinates for user selections of origin and destination points selected from anywhere on the displayed map image;
    computing information about a recommended route between the user selected origin and destination points; and
    transmitting the information about the recommended route through the data communication network to the client device, for presentation to the user.

11. The method of claim 10, wherein the information about the recommended route comprises a map image illustrating a path of the recommended route from the origin point to the destination point.

12. The method of claim 10, wherein the information about the recommended route comprises textual directions for maneuvering from the origin point to the destination point.

13. A product comprising client/server instructions for programming a computer to implement the steps of the method of claim 10, and a machine readable medium bearing the instructions.

14. The method of claim 1, further comprising:
    receiving a request from the user through a data communication network from the client device;
    wherein the transmitting of the map image through the data communication network is performed in response to receipt of the request.

15. The method of claim 14, wherein the script downloading of the software script to the client device is performed together with the transmitting of the map image in response to receipt of the request.

16. The method of claim 14, further comprising presenting an initial map to the user via the client device; wherein:
    the received request relates to an interactive user input selection from the initial map presented to the user, and
    the transmitted map image is a map image selected from a database based on the selection.

17. The method of claim 16, wherein:
the initial map presented to the user is a large area map,
the selection indicates a position on the large area map for drill down, and
the transmitted map image is an enlargement for an area associated with the indicated drill down position.

18. The method of claim 16, wherein the initial map presented to the user represents an area around a current location of the client device.

19. The method of claim 16, wherein the initial map initial map presented to the user corresponds to a home location for the user designated by profile data.

20. The method of claim 10, wherein the script downloading of the software script to the client device is performed together with the transmitting of the map image.

21. The method of claim 10, further comprising:
presenting an initial map to the user via the client device;
wherein the user selection relates to a selection from the initial map presented to the user.

22. The method of claim 21, wherein:
the initial map presented to the user is a large area map,
the user selection indicates a position on the large area map for drill down, and
the transmitted map image is an enlargement for an area associated with the indicated drill down position.

23. The method of claim 21, wherein the initial map initial map presented to the user represents an area around the current location of the client device.

24. The method of claim 21, wherein the initial map initial map presented to the user corresponds to a home location for the user designated by profile data.

* * * * *